(12) United States Patent
Jacobs

(10) Patent No.: US 9,199,421 B2
(45) Date of Patent: *Dec. 1, 2015

(54) METHODS, COMPOSITIONS AND BLENDS FOR FORMING ARTICLES HAVING IMPROVED ENVIRONMENTAL STRESS CRACK RESISTANCE

(71) Applicant: Viva Healthcare Packaging Limited, Wong Chuk Hang (HK)

(72) Inventor: Ian Orde Michael Jacobs, Victoria (AU)

(73) Assignee: VIVA HEALTHCARE PACKAGING LIMITED, Hong Kong (HK)

( * ) Notice: Subject to any disclaimer, the term of this patent is extended or adjusted under 35 U.S.C. 154(b) by 0 days.

This patent is subject to a terminal disclaimer.

(21) Appl. No.: 13/946,024

(22) Filed: Jul. 19, 2013

(65) Prior Publication Data
US 2013/0300027 A1    Nov. 14, 2013

Related U.S. Application Data

(62) Division of application No. 10/542,280, filed as application No. PCT/AU2004/000060 on Jan. 16, 2004, now Pat. No. 8,518,318.

(30) Foreign Application Priority Data

Jan. 16, 2003 (AU) ............ 2003900292
Mar. 24, 2003 (AU) ............ 2003901342
Apr. 24, 2003 (AU) ............ 2003901952

(51) Int. Cl.
| | |
|---|---|
| B29D 23/00 | (2006.01) |
| B29C 45/00 | (2006.01) |
| B29C 45/72 | (2006.01) |
| B82Y 30/00 | (2011.01) |
| C08J 5/00 | (2006.01) |
| C08L 23/04 | (2006.01) |
| C08L 23/10 | (2006.01) |
| B29C 71/02 | (2006.01) |
| B29K 23/00 | (2006.01) |
| B29L 23/20 | (2006.01) |
| C08L 23/08 | (2006.01) |
| C08L 23/12 | (2006.01) |

(52) U.S. Cl.
CPC ............ *B29D 23/00* (2013.01); *B29C 45/00* (2013.01); *B29C 45/0001* (2013.01); *B29C 45/7207* (2013.01); *B82Y 30/00* (2013.01); *C08J 5/005* (2013.01); *C08L 23/04* (2013.01); *C08L 23/10* (2013.01); *B29C 45/0005* (2013.01); *B29C 45/0013* (2013.01); *B29C 2071/022* (2013.01); *B29K 2023/06* (2013.01); *B29K 2023/0641* (2013.01); *B29K 2023/083* (2013.01); *B29K 2023/086* (2013.01); *B29K 2023/12* (2013.01); *B29K 2995/0048* (2013.01); *B29L 2023/20* (2013.01); *C08J 2323/04* (2013.01); *C08J 2323/10* (2013.01); *C08L 23/0807* (2013.01); *C08L 23/12* (2013.01); *C08L 2205/02* (2013.01)

(58) Field of Classification Search
None
See application file for complete search history.

(56) References Cited

U.S. PATENT DOCUMENTS

| | | | |
|---|---|---|---|
| 4,061,694 A | 12/1977 | Castagna | 525/387 |
| 4,375,442 A * | 3/1983 | Ota et al. | 264/458 |
| 5,015,511 A | 5/1991 | Treybing et al. | |
| 5,021,515 A | 6/1991 | Cochran et al. | |
| 5,075,362 A | 12/1991 | Hofeldt et al. | |
| 5,089,323 A | 2/1992 | Nakae et al. | |
| 5,116,660 A | 5/1992 | Komatsu et al. | |
| 5,143,769 A | 9/1992 | Moriya et al. | |
| 5,153,038 A | 10/1992 | Koyama et al. | |
| 5,159,005 A | 10/1992 | Frandsen et al. | |
| 5,194,478 A | 3/1993 | Frandsen et al. | |
| 5,211,875 A | 5/1993 | Speer et al. | |
| 5,278,272 A | 1/1994 | Lai et al. | |
| 5,281,679 A | 1/1994 | Jejelowo et al. | |
| 5,288,450 A * | 2/1994 | Koizumi et al. | 264/235 |
| 5,293,766 A | 3/1994 | Chang | |
| 5,350,807 A | 9/1994 | Pettijohn et al. | |
| 5,352,402 A * | 10/1994 | Orimoto et al. | 264/526 |
| 5,399,289 A | 3/1995 | Speer et al. | |
| 5,492,742 A | 2/1996 | Zenner et al. | |
| 5,516,563 A | 5/1996 | Schumann et al. | 428/34.2 |
| 5,539,076 A | 7/1996 | Nowlin et al. | |
| 5,594,080 A | 1/1997 | Waymouth et al. | |
| 5,641,825 A | 6/1997 | Bacskai et al. | |
| 5,686,528 A | 11/1997 | Wills et al. | |

(Continued)

FOREIGN PATENT DOCUMENTS

| | | |
|---|---|---|
| EP | 0004651 | 3/1979 |
| EP | 0519616 | 5/1982 |

(Continued)

OTHER PUBLICATIONS

International Search Report dated Jan. 20, 2009, issued in corresponding international application No. PCT/JP2008/071854.

(Continued)

*Primary Examiner* — Monica Huson
(74) *Attorney, Agent, or Firm* — Ostrolenk Faber LLP

(57) ABSTRACT

Several processes for the manufacture of thin-walled tubes are described, including: injection moulding an article and annealing the article, injection moulding a blend of a polymer and a high melt flow polymer, injection moulding a blend of a polymer and nanoparticles or nanocomposites. Using nanoparticles to improve ESCR and/or tear resistance of a polymer or blend is also disclosed.

7 Claims, No Drawings

(56) References Cited

U.S. PATENT DOCUMENTS

| | | | |
|---|---|---|---|
| 5,834,079 A | 11/1998 | Blinka et al. | |
| 5,910,523 A | 6/1999 | Hudson | |
| 5,952,066 A | 9/1999 | Schmidt et al. | |
| 6,084,030 A | 7/2000 | Janssen et al. | |
| 6,248,279 B1 | 6/2001 | Walsh | |
| 6,254,804 B1 | 7/2001 | Matthews et al. | |
| 6,274,210 B1 | 8/2001 | Ebner et al. | |
| 6,339,121 B1 | 1/2002 | Rafailovich et al. | |
| 6,355,736 B1 | 3/2002 | Nakashima et al. | |
| 6,355,757 B2 | 3/2002 | Garcia-Franco et al. | |
| 6,407,171 B1 | 6/2002 | Agarwal et al. | 525/191 |
| 6,414,107 B1 | 7/2002 | Zobel et al. | 400/208 |
| 6,423,776 B1 | 7/2002 | Akkapeddi et al. | |
| 6,437,050 B1 | 8/2002 | Krom et al. | |
| 6,444,735 B1 | 9/2002 | Eckel et al. | |
| 6,462,122 B1 | 10/2002 | Qian et al. | |
| 6,525,157 B2 | 2/2003 | Cozewith et al. | |
| 6,555,643 B1 | 4/2003 | Rieger | 526/351 |
| 6,558,605 B1 | 5/2003 | Wilson | 264/328.8 |
| 6,818,173 B1 | 11/2004 | Khait | 265/540 |
| 6,838,523 B2* | 1/2005 | Williams et al. | 525/240 |
| 8,518,318 B2* | 8/2013 | Jacobs | 264/328.1 |

FOREIGN PATENT DOCUMENTS

| | | |
|---|---|---|
| EP | 100843 | 2/1984 |
| EP | 0 035 035 | 12/1984 |
| EP | 0 140 719 | 5/1985 |
| EP | 0301719 | 2/1989 |
| EP | 0380319 | 8/1990 |
| EP | 533154 | 3/1993 |
| EP | 533155 | 3/1993 |
| EP | 533156 | 3/1993 |
| EP | 533160 | 3/1993 |
| EP | 1217033 A2 | 6/2002 |
| EP | 1217033 A3 | 6/2002 |
| EP | 1 334 913 | 8/2003 |
| GB | 2139551 | 11/1984 |
| JP | 54-022281 | 2/1979 |
| JP | 61-238836 | 10/1986 |
| JP | 07316355 | 12/1995 |
| JP | 07316365 | 12/1995 |
| JP | 07330982 | 12/1995 |
| JP | 09174589 | 7/1997 |
| JP | 11-001580 | 1/1999 |
| JP | 07316356 | 5/2005 |
| WO | WO 90/00504 | 1/1990 |
| WO | WO 90/00578 | 1/1990 |
| WO | WO 95/02616 A2 | 1/1995 |
| WO | WO 95/02616 A3 | 1/1995 |
| WO | WO 96/40799 | 12/1996 |
| WO | WO 97/07161 | 2/1997 |
| WO | WO 97/44364 | 11/1997 |
| WO | WO 98/46409 | 10/1998 |
| WO | WO 98/51758 | 11/1998 |
| WO | WO 98/51759 | 2/1999 |
| WO | WO 99/07782 | 2/1999 |
| WO | WO 99/29749 | 6/1999 |
| WO | WO 99/52950 | 10/1999 |
| WO | WO 99/52955 | 10/1999 |
| WO | WO 00/01766 | 1/2000 |
| WO | WO 00/09310 | 2/2000 |
| WO | WO 00/76754 | 12/2000 |
| WO | WO 01/27169 | 4/2001 |
| WO | WO 01/48080 | 7/2001 |
| WO | WO 01/72511 | 10/2001 |
| WO | WO 02/074817 A2 | 9/2002 |
| WO | WO 02/074817 A3 | 9/2002 |
| WO | WO 02/079318 A2 | 10/2002 |
| WO | WO 02/079318 A3 | 10/2002 |
| WO | WO 03/039639 A2 | 5/2003 |
| WO | WO 03/039639 A3 | 5/2003 |

OTHER PUBLICATIONS

U.S. Appl. No. 08/857,276.

Bohm et al., "High-Density Polyethylene Pipe Resins," Adv. Matter. 4, 1992, 234-238.

Cini et al. "Five-Coordinated Metal Complexes of Bis(2-hydroxy-1-naphthylindeneimine-3-propyl)-amine and their Reactivity Towards Dioxygen. Part I. An Electrochemical Investigation on Manganese (II), Iron(II), Cobalt(II), Nickel(II) and Copper(II) Complexes," Inorganica Chim. Acta 1984, vol. 88, pp. 105-113.

Hauptman et al., "Stereoblock Polypropylene: Ligand Effects on the Stereospecificity of 2-Arylindene Zirconocene Catalysts," Journal of American Chemical Society, vol. 117, pp. 11586, 1995.

Zanello et al. Electrochemical Behavior of a Series of Iron(II) Nickel(II) and Copper(II) Complexes with Linear Pentadentate Schiff-Base Ligands,: Inorganica Chim. Acta 1983, vol. 74, pp. 89-95.

* cited by examiner

METHODS, COMPOSITIONS AND BLENDS FOR FORMING ARTICLES HAVING IMPROVED ENVIRONMENTAL STRESS CRACK RESISTANCE

CROSS REFERENCE TO RELATED APPLICATIONS

This application is a divisional of U.S. Ser. No. 10/542,280, filed Apr. 10, 2006, now U.S. Pat. No. 8,518,318, which is a 35 U.S.C. §371 National Phase conversion of PCT/AU2004/000060, filed Jan. 16, 2004, which claims benefit of Australian Application No. 2003900292, filed Jan. 16, 2003, Australian Application No. 2003901342, filed Mar. 24, 2003 and Australian Application No. 2003901952, filed Apr. 24, 2003, the contents of which are incorporated herein in full by reference.

FIELD OF THE INVENTION

The present invention according to one aspect, relates to a process for the manufacture of flexible thin-walled articles, such as tubes or the like, wherein an improvement in Environmental Stress Crack Resistance (ESCR) and other properties is provided by annealing of the article after forming to its final shape. There are also provided, according to further aspects of the invention, compositions and blends that may be useful in the manufacture of flexible thin-walled articles or other articles, die compositions and blends having improved ESCR and other properties.

DISCUSSION OF THE PRIOR ART

Thin-walled tubular containers, such as those used in the cosmetics industry, are currently produced mainly by a combination of extrusion and cutting-to-length of the tube body, injection moulding of the head and shoulders and the welding of the body to the head and shoulders. Low Melt Flow Index (MFI) polyethylene (MFI generally less than 2) is the preferred polymer for tube manufacture as it generally imparts the properties of good "feel" and flexibility required by customers and is suitable for extrusion processing. In addition, low MFI low density polyethylene/(LDPE) offers sufficient product resistance and barrier properties to make it suitable for most products currently packed into tubes. In cases where the barrier properties of polyethylene are inadequate for particular applications, medium density polyethylene (MDPE), high density polyethylene (HDPE), polypropylene (PP) and multilayer polymer films are commonly used. Because the body of the tube is extruded, low MFI polymers with inherently good ESCR are able to be used in their manufacture. In addition, being a relatively low shear rate process, the extrusion process introduces minimal stresses and molecular orientation of the polymer into the tube body during manufacture. The use of polymers with inherently good ESCR, the relative lack of molecular orientation in extruded and extrusion/blow-moulded tubes as well as the relatively low pressures and processing speeds inherent in the extrusion process results in extruded tubes having low built-in stresses and inherently good ESCR. Consequently, stress relief of extruded tubes by annealing is of minimal value for the vast majority of applications and tube types.

While the injection moulding of flexible thin walled articles such AS tubes has been proposed, prior to the developments described in PCT/AU98/00255 (the '255 patent), which is incorporated herein by reference, it has not been possible to injection mould such articles having relatively long, thin sections without the articles being too susceptible to failure to be of commercial or practical use. The main problems have been associated with the polymers used to injection mould tubes, in that the process of injection moulding a cylindrical or other shaped tube requires the polymer to simultaneously have a high MFI to enable the polymer to flow down the long, narrow and curved path dictated by the tube shape without the use of excessive injection pressures, yet to have sufficiently good mechanical properties to be able to withstand handling and resist the stress cracking effects of many of the products that will be packed in it. To injection mould a tube requires the polymer/polymer blend to have flow properties capable of forming moulded parts with radii and a length/thickness ratio of 100 and often much higher, such as over 350. Typically the polymer or polymer blends are required to have an MFI of greater than 10, preferably greater than 20, more preferably greater than 30 and frequently greater than 50. It is well known that the physical properties of polymers, particularly ESCR, decrease significantly as the MFI increases, so the inherent ESCR properties of polymer/polymer blends with MFIs required, for injection moulded tubes are significantly and inherently lower than those for extruded tubes. To compound this problem, forcing a polymer to flow in a mould with such dimensions introduces severe stresses into the polymer, these stresses being "frozen" into the article thus produced when the polymer rapidly cools below its crystallising temperature before these stresses can be relieved. These stresses result in the tube having surprisingly different and deteriorated properties relative to the other products moulded from the same polymers under less severe moulding conditions.

Further stresses are introduced into injection moulded tubes when they are filled with product and then crimped and sealed—most often by heat sealing or ultrasonic welding. This process often involves bending the 'open' end of the tube back on itself through an angle of up to 180° to form a fold at the edge of the seal. This fold is in the direction of the flow of the polymer during moulding, which direction having been demonstrated to be the direction of maximum weakness of the moulded product This 'folded and sealed' area, where the tube is required to be deformed in order to effect a seal, is an area of the injection-moulded tube particularly susceptible to stress and Ilex cracking. Similarly, the body of the tube is permanently distorted, and consequently additionally and permanently stressed, by the crimping/sealing process, as can be readily seen from the distorted shape of the crimped and sealed tube relative to its uncrimped and unsealed shape. These stresses, especially those induced by permanent distortion of the article after crimping and sealing, but also those imposed during the squeezing and flexing of the tube during use, have the effect of significantly reducing the ESCR and other physical properties of the polymers that make up the injection moulded article, thereby making it necessary to use polymers that display unusually good ESCR and other physical properties when moulded into the desired articles. Such polymers/blends may have a number of disadvantages relative to other polymers/blends, such as being more expensive, requiring longer cooling times (and hence longer cycle times), having higher stiffness (ie. poorer 'feel'), requiring more intense or expensive compounding, etc.

The following examples illustrate the exceptionally high level of stresses that arc moulded into tubes when they are manufactured using the injection moulded process as opposed to the extrusion process.

Tubes with 120×35 mm dimensions were injection moulded using DuPont 2020T polymer, a 1.1 MFI polymer extensively used in commercial extruded tube manufacture and which DuPont describes as "especially suited for injection moulded closure and extruded tubing where flexibility and maximum resistance to environmental stress cracking is required". The injection-moulded tubes were moulded with extreme difficulty, requiring very high injection pressures and temperatures simply to get the 2020T to fill the mould. In each moulding significant degrees of core shifting/flexing were noted, due no doubt to the extremely high injection pressures that were required. In addition, it was noted that the tubes had virtually no resistance to flexing in the direction of the material flow, with significant cracking being induced with less than 5 manual squeezes of the tube. The environmental stress cracking of the same tubes was tested using the ESCR test as herein described and, in spite of claims of "maximum resistance" to environmental stress cracking, was found to be totally inadequate for moulding thin-walled tubes by injection moulding. This is in stark contrast with its status as a 'polymer of choice' for tubes made by the extrusion process. The dramatic degradation of the properties of 2020T when injection moulded is almost exclusively due to the exceptionally high level of moulded-in and oriented stresses relative to those in tubes extruded from the same material.

In another illustration of the very high level of moulded-in stresses inherent in injection moulded tubes, Dowlex 2517, a 25 MFI LLDPE, was moulded into 150×50 mm tubes. In a pamphlet on. its Dowlex LLDPEs, Dow advises that LLDPEs have substantially better ESCR properties than equivalent high pressure LDPE. To illustrate the difference, a Dow pamphlet states that in one comparative test a high flow Dowlex LLDPE has an ESCR in oil some 80 times better than that achieved by a high pressure LDPE with the similar density and MFI (5700 hrs compared to 70 hrs). It further states that the LLDPE has an ESCR approximately 10 tunes better than the LDPE when immersed in a 10% Teric solution at 50° C. (225 hrs compared to 26 hrs). However, contrary to these observations, we have found that when these polymers are moulded in the form of thin walled tubes and ESCR subsequently tested using the ESCR test as herein described, both Dow's 'Dowlex' LLDPE 2517 and Kemcor's LD 8153 (a high pressure LDPE with similar MFI and density) performed poorly in 10% Teric N9 at 50° C., and both failed within 20 minutes, an ESCR that is of the order of 600 times less than that indicated in the pamphlet. The extreme degradation in the ESCR performance of both polymers when injection moulded into tubes is almost exclusively the result of the high level of moulded-in and oriented stresses in the injection moulded tubes.

As an indication of the extent of the increase in Strain in the area of a tube that is folded and sealed relative to the unsealed (i.e. open) tube, the strain on the area resulting from sealing was calculated using the formula:

Strain in polymer=Radius of fold/Square of the thickness of the strip.

Assuming a nominal radius for a flat polymer strip of 1 meter and a strip thickness of 0.5 mm (a typical wall thickness for a tube), the strain on the unsealed polymer is 0.00025. When sealed, the radius of the strip at the edge of the seal is of the order of 0.65 mm, resulting in a calculated strain of 0.385. In other words, sealing the tube results in an increase in strain in the polymer of over 1600 times that in an unsealed tube. For extruded tubes, with their inherently higher ESCR polymer and significantly lower moulded-in processing stresses, this increase in strain presents few problems in terms of ESCR and/or tear strength performance. That is, annealing articles made using these polymers in combination with the extrusion process is not likely to result in noticeable and/or commercially valuable improvements in ESCR and tear strength of the article. However, the applicant has found that when injection moulding thin wall flexible articles, with their significantly higher moulded-in and oriented stresses and being formed from intrinsically lower ESCR polymers and hence having greater inherent susceptibility to flex and ESCR failure, annealing can make a significant difference to both the ESCR and/or tear strength of the article. Such improvements may mean the difference between functionality and non-functionality of the article in terms of its commercial application.

We have now found that annealing a flexible injection moulded thin walled article just before, during or after the article has been filled and/or distorted to its final required shape significantly improves the ESCR and a number of other physical properties of the article, such as resistance to tearing in the direction of the polymer flow when measured using the Gull wing Tear test method (ASTM D-1004). These improvements are most noticeable in the areas of the article that have had additional stresses imposed on them such as occur as a result of any distortion of the article during and subsequent to sealing or having load imposed on it by, for example, stacking. An additional benefit of the annealing of the present invention is that increasing their ESCR etc. enables the use of polymers/blends for the manufacture of flexible thin-walled articles that would, in their unannealed condition, result in flexible thin walled articles that arc either marginal or unsuitable for packaging particular products. During the annealing process the article may, if heated or otherwise treated sufficiently .to soften, and/or in cases where the article is sufficiently supported to prevent unwanted distortion of the article, melt the polymer, be reshaped by the application of appropriate forces by various equipment.

While not wishing to be bound by the proposed theory, it is believed that the rapid cooling of the polymer during the injection moulding step from a molten state to below the solidification temperature of the polymer results in various stresses and strains being captured in the solid piece, and that further stresses are introduced as a result of the distortion of the article resulting from the sealing process. These stresses make the article more susceptible to attack by stress crack agents and physical flexing, and hence to failure. This is particularly the case in the period immediately after filling and sealing when, due to the distortion of the moulding resulting from sealing, the stresses within the moulding are at their highest (to an extent, they 'relax' and dissipate over an extended time) and the stress crack agent is in direct contact with the article and can 'attack' the highly stressed areas in the period subsequent to filling and scaling to cause failure. It is believed that by. annealing the polymer, the stresses are relieved before the stress crack agents are able to 'attack' the stressed polymer in order to cause failure. If the stresses are not immediately relieved, it is believed that for many polymer formulations the stress crack agent is able to cause failure of the article before the 'normal' relaxation of the polymer is able to reduce the susceptibility to article failure.

The degree of moulded-in stresses, and hence the degree of reduction in ESCR and other property performance can vary somewhat from moulding to moulding and over time. Thus it is difficult to reliably and accurately compensate for the. variation in ESCR reduction between mouldings in the absence of annealing treatment. A further complication is that due to the gradual reduction in stresses over time together with the fact that the extent of stress reduction will depend on the conditions (primarily time and temperature) under which the articles are stored prior to and after filling and sealing, it is not possible to reliably and consistently forecast how long it may take for all tubes made from a particular polymer formulation to become suitable for use due to natural stress reduction. For this reason amongst others, in order to minimise the possibility of commercial failure due to inadequate ESCR and other property performance, it is currently generally necessary to use polymers with proven exceptionally good ESCR performance when In a stressed state. This requirement has a number of potentially negative aspects, in particular in the areas of potentially higher polymer/unit cost, increased cycle times and less-than-ideal 'feel' and flexibility. It is therefore advantageous if the moulded-in stresses can be relieved before they can substantially adversely affect the commercial performance of the thin walled article.

It has been found that, provided the moulded-in stresses in the injection moulded article are relieved to a greater or lesser extent before the stress crack potential of the product that is filled into the article has sufficient time in contact with the polymer in its stressed state to cause or initiate cracking, flexible thin walled injection moulded articles with improved ESCR and other property performance can be produced. Further, it has been found that annealing the articles enables a much wider range of polymers and polymer blends to be used in the manufacture of commercially useful flexible thin walled articles than is the case if annealing is not practiced.

If there is a significant time lapse between the moulding and filling & sealing operations (eg, if the article is moulded in one location, packed and then shipped to another location for filling and sealing) and it is desired to effect annealing of the moulding prior to the article being shipped—most conveniently, immediately post moulding—many of the benefits of annealing just prior to, during and/or after distortion of the article can still be achieved by annealing post moulding. The benefits of this may not as pronounced as those that can be achieved by annealing after the article has been distorted, but may, depending on the polymer formulation and moulding conditions, nevertheless be worthwhile.

The benefits of annealing post moulding but pre filling are most noticeable in areas of the moulding that are subjected to least additional stresses upon crimping and sealing. These areas are roost frequently those that are relatively distant to the 'crimp and seal' area—for example, those areas relatively near the head and shoulders of a tube. We have found that areas of the moulding that are annealed, allowed to cool (if the annealing process elevates the temperature of the moulding above its preannealing temperature) and then subjected to considerable distortion such as occurs in and around the sealed area of the rube during a crimp and seal operation may manifest dramatically deteriorated ESCR performance relative to the same considerably distorted areas in equivalent unannealed mouldings. This is illustrated by the ESCR test as herein described, in which three sets of strips of the polymer blend taken from the same area of the mouldings were subjected to said ESCR test. One set of strips was annealed after bending and stapling, another set was not annealed and the third set of strips was annealed prior to bending and stapling. The ESCR results were as follows:

Only 4% of strips annealed after bending and stapling failed within 190 hrs
25% of the unannealed strips failed within 190 hrs
Virtually all (94%) of strips annealed before bending and stapling failed within only 3.5 hrs.

DESCRIPTION OF THE INVENTION

As the above results illustrate, annealing tubes when they are in a stressed state significantly improves their ESCR relative to unannealed tubes, whereas annealing tubes in an unstressed state and subsequently stressing them results in dramatically reduced ESCR.

Thus, according to a first aspect of the present invention there is provided a process for the manufacture of flexible thin-walled articles comprising injection moulding a body of the article from a plastics material; adapting the body to form a base of the article; and annealing the plastics material.

Annealing is generally defined as the process for removing or diminishing the strains and stresses in thermoplastics. It is often achieved by heating the substance to be annealed and then allowing it to gradually cool. Two successful techniques often employed when annealing thermoplastics include one which withdraws the thermoplastics from a heat source, and the other which causes the heat from the heat source to diminish. Both techniques are often referred to as bulk annealing techniques since they involve heating the interior and exterior of the thermoplastics. The former is generally achieved in lehrs and the latter is generally achieved in ovens. Additional techniques for bulk annealing thermoplastics include those which employ infrared radiation. Thermal annealing is often the preferred method of annealing since simple equipment and techniques are widely and inexpensively available to practice the step. In other, less preferred embodiments, the annealing can be practiced by applying pressure, compression, or tension for a short time.

It is of increasing interest to reduce the stresses and strains of thermoplastics without employing bulk annealing techniques such as the above-described. Accordingly, a process for reducing strains in thermoplastics by surface annealing may be employed which unexpectedly and simultaneously preserves the physical and chemical properties of the thermoplastics. Surface annealing is denned as heating the outer layer of the thermoplastic which is the external layer of the thermoplastic that is often no more than half the thickness of the area to be annealed, for example, 0.25 mm thick in the case of a 0.5 mm wall-thickness article. Moreover, there is no limitation with respect to the heat source being utilized in this surface annealing other than that it does not cause the outer layer of the thermoplastic and the internal portion of the thermoplastic to be heated to the same temperature, wherein the internal portion is defined as any part of the thermoplastic not including the outer layer as previously defined. Thus heat may penetrate the internal portion; however, the internal portion is cooler than the outer layer after the outer film layer is surface annealed. Therefore, bulk annealing is prevented. Surface annealing is particularly effective in terms of increasing the ESCR of a thin walled flexible article when the surface that is annealed is the surface that will come into contact with the stress crack agent. The interior wall of a tube or other container, in preference to the exterior wall of a tube or other container, is an example of a surface for which surface annealing is particularly effective. This is because an annealed interior wall of a tube or other container presents the stress crack agent with a surface with reduced stress and hence an improved ESCR relative to an unannealed interior wall, thereby minimising the chances of the stress crack agent being able to initiate stress cracking that could eventually lead to the failure of the tube or container. If the outer surface of the tube or container is the annealed surface, the stress crack agent is able to initiate cracking in the unannealed interior surface with which it is in immediate contact, thereby potentially weakening the tube or container. Annealing of the interior surface of a tube or other container may be achieved by the blowing of hot air onto said surface, the close proximity of a source of radiant heat to the interior surface or other suitable means familiar to those skilled in the art.

Annealing of the injection moulded thin-walled article according to this aspect of the invention may be facilitated by one or more of a variety of techniques. For example, the annealing step may include subjecting the plastics material of the article to various types of electromagnetic radiation, such as far infra-red, infra-red, ultra-violet and microwave radiation. Alternatively, sonic, supersonic and/or ultrasonic energy, electrical energy, election arc, electron beam, plasma (e.g., corona, glow discharge, etc.), steam, heated gas (eg. not air), magnetic fields, ionising radiation, lasers, radio frequency and direct contact with heated or vibrating surfaces may be employed. Preferably, the annealing step is carried out by application of heat to the plastics material immediately before, during or immediately after the body is adapted to form the article.

According to a particular embodiment, the annealing process is carried out in situ by filling the article with a medium having a sufficiently high temperature to facilitate annealing of the article through the transfer of heat from the medium to the article itself. In this case, the heated medium may be inserted before, during or immediately after the distortion (if any) of the article. Due to the thin-wall nature of the article, the temperature of the areas of the articles that come into contact with, or are in relatively close proximity to, the medium may assume a temperature close or equal to that of the medium itself. For example, although the specific area of the article that will be sealed should preferably not come into direct contact with the medium, once the medium has been introduced into the article the temperature of the area to be sealed will tend towards that of the medium. Provided such temperature is high enough to initiate annealing, it will result, in the partial or complete annealing of the areas of the article, including the area of the article to be sealed. The temperature of the in situ annealing medium is preferably greater than 18° C., more preferably greater than 22° C., even more preferably greater than 25° C., yet even more preferably greater than 30° C., and most preferably greater than 35° C.

Alternative heat-based annealing processes include immersing the article in, or passing the article through a bath, oven or other apparatus containing or able to direct at or subject the article to a warming liquid or gas or other annealing agent For example, the articles can be immersed into a hot aqueous bath for sufficient time to heat them to within the desired temperature range. The particular residence time within the hot aqueous bath can depend on a variety of factors such as the shape and/or thickness of the articles and whether the aqueous bath is quiescent or agitated, whether the bath size to number of articles results in fluctuation of bath temperature, and other factors. This annealing method is particularly useful in cases where it is desirable that the filled contents of the article are also heated above a particular temperature, such as in retorting of some foods. The pieces can then be removed from the aqueous bath, dried, and cooled to ambient temperature.

In other preferred embodiments, radiant heating is employed, such as heating with, infrared light One advantage of radiant heating especially with infrared light is the rapidity with which the heating step can be practiced. Still another advantage is that a separate drying step can be eliminated.

When one or more types of electromagnetic radiation is the annealing agent, an article comprised of the polymer should be exposed to the radiation for a time period at least sufficient to absorb enough energy to stress relieve-the polymer against stress cracking therein. Exposure occurs at one or more ranges of frequencies which are capable of being absorbed by the polymer and which are effective for stress relieving without or substantially without causing heat induced softening or flowing of the polymer. The electromagnetic radiation is selected from infrared, visible, ultraviolet, microwave, radio, laser and other types of electromagnetic radiation.

The annealing treatment may, depending on the plastics material and the article, be carried out prior to, during or after the distortion of the article. If the annealing process is carried out prior to the distortion of the article, it is preferred that the effects Of the annealing process are still impacting on the polymer during the distortion process. For example, if heat is used to effect annealing and the heat source is removed or significantly reduced prior to distortion of the article, the plastics material should preferably still be sufficiently warm during and after the distortion process to enable the annealing of the distorted article to take place. Another method of annealing using heat is to store the final packaged product in heated or naturally warm storage areas, the temperature in which is constantly at or periodically raised or allowed to rise to 22° C. or more, more preferably 25° C. or more, yet more preferably 27° C. or more, even more preferably 30° C. or more and most preferably 35° C. or more for sufficient time to anneal the article or part thereof as measured by an improvement in ESCR and/or Gullwing tear resistance in the direction, of the flow of the polymer relative to the unannealed article or part thereof.

The entire article does not necessarily need to be annealed to achieve the beneficial effects of this aspect of the invention. If desired, the annealing process can be directed to one or more areas of the article in which it has been determined annealing will have particularly beneficial effects, such as those areas in the injection moulded article that are most susceptible to ESCR or other mechanical failure. Partial annealing of the article may be achieved by. for example, annealing some parts of the article by infrared radiation while shielding other parts of the article from the radiation. In the ease of a tube, areas that may be beneficially selectively annealed include the crimped/sealed and adjacent area and other areas of the tube that are distorted and consequently have additional and unusual stresses imposed on them as a result of the crimping/sealing process.

In addition, annealing can take place in one or more stages. For example, part of the article may first be subjected to annealing by, for example, filling it with a warm fluid medium. This will anneal mainly those areas of the article that are in contact with and/or close proximity to the warm fluid medium. When the article is a tube, this initial annealing process will primarily anneal the body of the tube, although if the medium is sufficiently .warm and sufficient time is allowed, it may also anneal other areas of the tube, such as the area to be crimped and sealed. Subsequent to the initial annealing, and in a separate operation, the tube may then be crimped and sealed at the open end, which will anneal this portion of the tube.

The extent of the desired annealing of a particular article can be determined by experimentation, and may vary depending on the extent/intensity of the deleterious effects of product to be packed into the article on the article as well as the nature of the plastics material used to mould the article and the moulding conditions used in the manufacture of the article and the desired properties of the treated article. Particularly deleterious products (ie. with high stress cracking potential) may beneficially be packed into articles which have been more extensively annealed than the same article intended for use with a less deleterious product. Similarly, articles mat have higher levels of stress due for example to their shape, the conditions of their manufacture and/or the extent of additional stresses imposed on them due to filling, crimping and sealing, etc, may benefit from mote intensive annealing than would otherwise be the case.

It is further noted herein that there is no limitation, with respect to the orientation of the thermoplastics to the heat sources employed. Therefore, the heat source and the thermoplastic may be moving, the heat source may move while the thermoplastic remains stationary or vice versa.

Once heated to the desired temperature range, the article may be cooled or allowed to cool as desired. The cooling step can similarly comprise various cooling techniques. Especially preferred for use herein are dry cooling techniques. For example, the articles can be cooled to room temperature with forced air convection cooling. Alternatively, the articles can be allowed to cool naturally, i.e. without accelerated cooling means. The air can be at room temperature or, if desired, can be chilled to shorten the cooling steps duration. In still another variation, ultrasonic heating can be used in substitution for the radiant heating. In still other variations, forced hot air convection heating can be employed. The pieces can be fed into a oven or other heating zones with various combinations of radiant and convection heating.

The plastics material of the article according to this aspect of the invention is not limited provided that it is capable of being injection moulded into a flexible thin-walled article. Indeed, preferred forms of the plastics material are hereafter described in accordance with further aspects of the invention.

In general, as described in PCT/AU98/00255, it has been found that it is possible to injection mould flexible thin-walled articles having relatively long thin-walled sections by selection of the polymers used in the injection moulding process having a time to failure of greater than 10 hours when tested according to the following ESCR test procedure:

i) a plurality (preferably 6 or more) strips of the polymer or polymer blend incorporating any post moulding treatment intended for the final article having the cross-sectional dimensions of 0.65 mm in thickness and 10 mm in width are injection moulded under high shear, long flow length conditions, the same as or similar to those intended for use in the manufacture of the flexible thin-walled article;

ii) the strips are bent back upon themselves and stapled 3 mm from the bend;

iii) the bent strips are immersed in a solution of a stress crack agent such as an ethoxylated nonylphenol, eg. a 10% solution of Teric N9 (nonylphenol ethoxylated with 9 moles of ethylene oxide—Orica Australia Pry Ltd) and held at a temperature of 50° C.;

iv) the strips are observed for signs of cracking, any signs of cracking are regarded as a failure; and v) the time to failure is when 50% of the strips show signs of cracking.

The ESCR test described above was developed to simulate the stresses that are imposed on the area of a tube that is crimped and sealed after the crimp and seal operation is carried out, this being an area of the crimped and sealed tube that is particularly Susceptible to flex and ESCR failure. The need for this special test arose because 'standard' ESCR tests such as ASTM D-1693 are totally inadequate for determining the ESCR of polymers when moulded into flexible thin walled mouldings and subsequently crimped and sealed—a fact clearly illustrated by the comparison between ESCR results on Dupont 2020T and Dowlex 2517 polymers using a 'standard' ESCR test and the abovementioned test.

Generally, in order to select a polymer blend suitable for the manufacture of flexible thin-walled articles it is necessary for the polymer blend to have an ESCR, tested according to the above procedure, of greater than 10 hours. Preferably the ESCR of the polymer blend is greater than 100 hours, more preferably greater than 200 hours and most preferably greater than 360 hours. Where the thin-walled article is a tube or other container used for the packaging of a composition such as a moisturiser or a shampoo which may be quite aggressive to the thin walled article and result in a degradation of its properties over time, it is desirable to select a polymer blend having an ESCR sufficiently high such that the thin walled article formed from the blend is able to withstand the rigours of use despite any degradation of properties resulting from the aggressive nature of the materials contained within the thin-walled article. Where the thin-walled article is used for the packaging of a relatively inert material, a lower ESCR may be tolerated.

The ESCR test as hereinabove defined may be conducted using a variety of stress crack agents. The preferred stress crack agent is Teric. N9, a 9-mole ethoxylate of nonylphenol ex Orica Australia Pty Ltd. Other ethoxylates of nonylphenol may also advantageously be used. Other stress crack agents may be used and will be selected based upon the desired end-use, for example mineral oils, cationic surfactants, solvents and other agents which will be apparent to those skilled in the art.

The ESCR test as described above is conducted under moulding conditions the same as or similar to Chose to be used in the manufacture of thin walled articles. For example, where it is intended to produce the thin walled article using a moulding incorporating melt flow oscillation techniques, it is advantageous to conduct the ESCR tests on panels produced from mouldings made by employing melt flow oscillation techniques. Similarly, the moulding conditions intended for use to mould the thin walled articles, such as injection speed, injection pressure, melt temperature, core and cavity temperature, etc. are advantageously used to produce mouldings for use in the ESCR test.

The suitability of a polymer or blend for the application of the present invention, as well as the potential beneficial effects thereof, may be determined by carrying out the ESCR test as described above, but preferably with the following additions and modifications:

Prepare two sets of 6 or more strips for subjecting to the ESCR test

After bending and stapling the two sets of strips, subject one set of strips to the proposed annealing treatment (eg. an elevated temperature of 50° C. for 30 minutes, allow the strips to cool to 22° C.) and maintained at 22° C. for 2 hrs Insert the two sets of strips in the stress crack medium as prescribed by the ESCR test.

The potential benefit of the present invention may be assessed by comparing the ESCR and/or Gullwing tear resistance of the polymer when tested with and without being subjected to the annealing process when in the stressed state. The present invention is particularly applicable and useful for thin walled articles where the difference in time to failure, as measured by the ESCR test as herein described, between annealed and unannealed strips of the polymer blend used to manufacture the article is greater than 5 hrs, preferably greater than 10 hrs, more preferably greater than 20 hrs, even more preferably greater than 30 hrs, more preferably greater than 50 hrs, even more preferably greater than 100 hrs and most preferably greater than 350 hrs.

Alternatively, the suitability of a polymer or blend for the application of the present invention may be determined by comparing the Gullwing Tear Resistance (measured in the direction of the flow of the polymer) of annealed and unannealed strips cut from mouldings such as may be used in the ESCR test, such strips being of suitable dimensions for carrying out the test. Annealed strips preferably have tear resistance that is more than 5% greater than that of unannealed strips, preferably more than 10% greater, more preferably more than 15% greater and most preferably more than 20% greater. The Tear Resistance of an injection moulded flexible thin walled article is particularly relevant when the article is made of polymers that have a tendency to split or tear relatively easily, such as polypropylene. This tendency to tear or split is often exacerbated when the polymers are moulded into articles that are, by the nature of the moulding process, tool design and moulding conditions, highly orientated. The Gullwing Tear test is particularly useful for assessing the suitability of, amongst other polymers, polypropylene-based polymers and blends thereof (including those cited above) for the production of injection moulded flexible thin walled articles because such polymers and blends thereof may well pass the ESCR test but still be unsuitable for commercial injection moulded flexible thin walled articles because of poor tear resistance. As is noted above, annealing such articles by means of the present, invention may improve their tear resistance to the point where the article develops commercial utility.

The benefit of the present invention is illustrated by the following example. A formulation consisting of 25% Profax SC973 (100 MFI PP ex Basell), 34% Engage 8401 (30 MFI mPE ex Dupont-Dow) and 41% WSG 189 (100 MFI LDPE ex Qenos) was moulded into 165 mm long by 0.5 mm thick cylindrical tubes under moulding conditions designed to introduce maximum, stresses into the moulded tubes. The ESCR of both annealed and unannealed strips cut from tubes was assessed using the ESCR method described herein. It was found that over 60% of unannealed strips taken from unannealed tubes failed the ESCR test within 2 hrs, whereas no failures were noted in the. strips taken from the tubes, said strips having, been annealed by heating the stapled strips for 30 minutes at 50° C., cooling to 22° C. and conditioning at 22° C. for 2 hrs. Further, 94% of the unannealed strips, compared to only 22% of the annealed strips, had failed by 360 hrs. This illustrates that the present invention significantly improves the ESCR of injection moulded flexible thin walled articles, and enables the use of many polymer blends that may not have adequate ESCR when tested according to the method described herein and which are intended for use for the manufacture of commercially valuable flexible thin walled articles.

The benefits of the present invention are most noticeable in flexible thin-walled articles having a thin section less than 1 mm in thickness and wherein the thin section is substantially continuous for greater than 50 mm in the direction of flow of the molten polymer blend in the mould, preferably greater than 90 mm in the direction of flow of the molten polymer blend in the mould and most preferably greater than 100 mm in the direction of flow of the molten polymer blend in the mould. Blends of isotactic polypropylene with ethylene propylene copolymers having 4 wt. % to 35 wt. % ethylene, both components having isotactic propylene sequences long enough to crystallize are described in WO 00/01766 which is hereby incorporated by reference. Such blends may be suitable for the manufacture of flexible rubes and other containers that are subjected to heating by such methods as heat-filling with the product the container is required to contain and/or heat treating the filled container by methods such as retorting. Blends conforming to the above specification comprise 1 wt % to 95 wt % of the isotactic polypropylene and an ethylene propylene copolymer with greater than 65 wt % propylene and preferably greater than 80 wt. % propylene.

Blends of various polypropylene polymers and ethylene, propylene or butene α-olefin polymers may also be particularly suitable for the manufacture of flexible tubes and other containers that are subjected to heating by such methods as heat-filling with the product the container is required to contain and/or heat treating the. filled container by methods such as retorting. Blends conforming to the above specification comprise component (a) at least one isotactic, syndiotactic or atactic polypropylene homopolymer or α-olefin copolymer, preferably one or more of a $C_2$ to $C_{20}$ α-olefin copolymer, more preferably one or more of a $C_2$ to $C_8$ α-olefin copolymer made with a variety of catalysts such as metallocene or similar catalysts, and component (b) at least one of an ethylene, propylene and/or butene copolymer, preferably a $C_2$ to $C_{20}$ α-olefin ethylene, propylene or butene copolymer, more preferably $C_2$ to $C_8$ α-olefin ethylene copolymer made with a variety of catalysts such as metallocene or similar catalysts and featuring a super-random distribution of the copolymer within and amongst the molecular chains of the polymer. The blends consist of 1% to 99% of component (a) and 99% to 1% of component (b), preferably 30% to 99% of component (a) and 70% to 1% of component (b), even more preferably 4S% to 99% of component (a) and 55% to 1% of component (b), yet more preferably 55% to 99% of component (a) and 45% to 1% of component (b). and most preferably 60% to 99% of component (a) and 40% to 1% of component (b).

As is noted in PCT/AU98/00255, AU 200020674 A1, AU 72146-99, Australian Innovation Patent No 2002200093 and Australian Innovation Patent 2002100211, all of which are hereby incorporated by reference, blending at least one compatible agent with at least one polymer frequently has the effect of substantially improving the ESCR. Such incorporation of a compatible agent also frequently improves the Gullwing tear test of the blend. The at least one compatible agent is preferably a polymer (also referred to herein as a 'compatible polymer') and when blended with the at least one polymer results in blends having properties which, when used to mould flexible thin-walled articles such as flexible injection moulded tubes, are superior to the original constituents or the neat polymers.

This phenomenon is advantageously used to formulate blends suitable for the injection moulding of the flexible thin walled articles of the invention.

A particular class of compatible agents have been found by the applicant to be particularly useful in blends for the manufacture of flexible thin-walled articles by injection moulding. Those are high melt flow compatible polymers. It has been found that blends including Such compatible agents are particularly useful in the process described above in relation to the first aspect of the invention, and may also be useful in processes that do not include the above described annealing of the article formed.

Therefore, according to a second aspect of the invention there is provided a process for the manufacture of flexible thin-walled articles comprising injection moulding a blend of (a) at least one polymer and (b) at least one high melt flow compatible polymer having an MFI of greater than 100.

It will be appreciated that the following discussion of the blends according to the second aspect of the invention will be equally applicable to the processes of the first aspect of the invention.

The high melt flow compatible polymer has an MFI of greater than 100, preferably greater than 200, more preferably greater than 300, and may have an MFI of greater than 500, still further greater than 1000 and yet further greater than 1,500. One or more of the polymer components of either or both (a) and (b) are advantageously produced with a metallocene or similar catalyst system.

In the polymer blend, component (a) is preferably about 40 to about 99.9 weight percent of the blend based on the total weight of (a) and (b) and forms the continuous or co-continuous phase of the blend. The polymer blend is generally formed by mixing blend components (a) and (b) under high shear mixing conditions or other means capable of producing an intimate mix, such as in parallel or series reactors, each reactor producing one or more components of blend components a) and/or b). A unit such as a twin-screw extruder would be an example of a suitable piece of mixing equipment. Other means to achieve a well mixed blend will be apparent to those skilled in the art.

The polymer blend may be prepared by extrusion of some or all of the components of the polymer blend and the resulting extrusion chopped and used in the injection moulding process of the present invention. Alternatively, the polymer blend may be provided in its component form and subjected to mixing before and during the melting of the polymer blend in the present process.

The high melt flow compatible polymer may be selected from the group consisting of ethylene vinyl acetate; ethylene, vinyl alcohol; plasticised polyvinyl acetate and polyvinyl alcohol; alkyl carboxyl substituted polyolefins; copolymers of anhydrides of organic acids; epoxy group containing copolymers; chlorinated polyethylene; ethylene-propylene-butylene etc. copolymers; ultra low density, very low density, low density, medium density and high density polyethylene and copolymers thereof; polypropylene, polybutylene and copolymers thereof; polyester ethers; polyether-esters (such as DuPont's Hytrel range); acrylonitrile-methacrylate copolymers; block copolymers having styrene end blocks; half esters; amino and alkoxysilane grafted polyethylenes; vinyl addition polymers; styrene-butadiene block copolymers; acid grafted polyolefins; vinyl pyrrolidine grafted polyolefins; block copolymers of dihydric monomers; propylene graft unsaturated esters; modified polyolefins comprising amide, epoxy, hydroxy or $C_2$-$C_6$ acyloxy functional groups; other polymeric compatibilisers suitable for use with polyolefins; particles coated with any of the above; and mixtures thereof. In the above compatible polymers the functional groups are generally incorporated into the modified polyolefin as part of an unsaturated monomer which is either copolymerised with an olefin monomer or grafted onto a polyolefin to form the modified polyolefin. Included are ethyl and/or methyl acrylates of ethylene and/or propylene, and ethylene acrylic acid and methacrylic acid copolymer resins.

Also included are blends of compatible polymers, such as a neutralised ionomer such as a Surlyn (Dupont) and EEA and/or EMA and/or EMAA. For example, a low MFI partly neutralised ionomer such as Surlyn 9970 (MFI=14) may be compounded with a high MFI EMA such as Nucrel 599 (Dupont) (MFI=500) to achieve a compatible polymer blend with a higher MFI than is achievable with the Surlyn alone, while still being able to benefit from the beneficial properties of the Surlyn. Those skilled in the art will appreciate that. the above example is but one of a very wide variety of combinations of compatible polymers that arc covered by the present invention.

Alkyl carboxyl substituted polyolefins may include substituted polyolefins where the carboxyl groups are derived from acids, esters, anhydrides and salts thereof. Carboxylic salts include neutralised carboxylic acids and are often referred to as ionomers (eg. Surlyn). Typically acids, anhydrides and esters include methacrylic acid, acrylic acid, ethacrylic acid, glysidyl maleate, 2-hydroxyacrylate, diethyl maleate, maleic anhydride, maleic acid, esters of dicarboxylic acids, etc. Preferred examples include ethylenically unsaturated carboxylic acid copolymers such as polyethylene methacrylic acid and polyethylene acrylic acid and salts thereof. Copolymers of anhydrides of organic acids include copolymers of maleic anhydride as well as copolymers of cyclic anhydrides.

Poly-2-oxazoline compounds and fluoroelastomers are also suited for use as a high melt flow compatible polymer. Incorporation of 1-40%, most preferably 2-20% of poly-2-oxazoline compounds is preferred. These compatible polymers improve the adhesion of the PE blend to various substrates, which may make them useful for printing or labelling. The compatibilizing polymer comprises an α-olefin copolymer substrate grafted with amounts of monovinylidene aromatic polymer. Preferably, the α-olefin copolymer Substrate is a terpolymer of ethylene, propylene and a non-conjugated diolefin. Particularly useful as compatible polymers and high MFI compatible polymers are various aromatic/aliphatic olefin copolymers of which styrene-1,4-butadiene-butylene-styrene bock copolymers (SBBSA copolymers), styrene-butadiene-styrene copolymers (SBS copolymers) and styrene-ethylene-butylene-styrene copolymers (SEBS copolymers) are particularly useful examples for the production of flexible thin walled articles.

The high melt flow compatible polymer of the second aspect of the present invention is a compatible polymer or a mixture thereof wherein at least one compatible polymer generally has an MFI of greater than 100, preferably greater than 200, more preferably greater than 300, and potentially greater than 500, or greater than 1,000, or still further greater than 1500. Unless otherwise stated, MFI is measured according to ASTM D 1238 (Condition 190° C./2.16 kg). Unless otherwise stated, the MFI of polymers in which propylene constitutes over 50% of the weight units of the polymer are measured by ASTM D 1238 at 230° C., 2.16 kg. Preferably the high melt flow compatible polymer of the present invention is a polypropylene homopolymer, a block or random co or terpolymer of polypropylene, or a mixture thereof, wherein the propylene-based polymer component has an MFI (as measured by ASTM D 1238 at 230° C., 2.16 kg) of 100 g/10 min or more, often greater than 200, sometimes greater than 300, and even greater than 1500. Preferably the propylene-based polymer component is an isotactic or syndiotactic polypropylene homopolymer or copolymer having a MFI falling within the ranges specified above. Preferably the propylene-based polymer component will have a MWD of from 1.8 to 4.0 and a narrow composition distribution that is characteristic of metallocene or similar catalysed propylene polymers. However, propylene-based polymers such as are cited in U.S. Pat. No. 6,476,173 and which is incorporated herein by reference and which have MWDs up to 20 will often produce good results. Polymers such as are cited above are conveniently produced using a stereospecific metallocene catalyst system. Random ethylene/propylene/vinyl aromatic interpolymers such as ethylene/propylene/styrene interpolymers may also be used as the compatible and/or high melt flow compatible polymer in the present invention. Polymers having similar specifications to those described above but having MFIs less than 100 are also useful as compatible polymers of the present invention.

A wide variety of polypropylene-based high melt flow compatible polymers, particularly when blended with low molecular weight plastomers, substantially linear polyethylenes, metallocene long-chain branched polyethylenes and copolymers of the aforementioned ethylene polymers as the polymer, will produce blends suitable for use in the process of the present invention. Many monomers have been copolymerized with propylene to form copolymers of propylene for use as compatible polymers. Many high MFI grades of these copolymers are suitable as the polymer or compatible polymers for use in the present invention.

High MFI polypropylenes suitable as a high melt flow compatible polymer for use in the process of the present invention include isotactic, sydiotactic and atactic polypropylene and blends thereof of various MFIs, densities and crystallinities as would produce desired properties in products moulded by the process of the present invention. Polypropylenes particularly useful as the high melt flow compatible polymer include homopolymers or copolymers of propylene and one or more α-olefins selected from ethylene or linear or branched $C_4$ to $C_{26}$ α-olefins, preferably ethylene or $C_4$ to $C_8$ α-olefins, more preferably ethylene, 1-butene, 1-hexene, 4-methyl-1-pentene, 3-methyl-1-pentene, 3,5,5-trimethyl-1-hexene, and 1-octene, even more preferably ethylene or 1-butene or hexene or octene, and optionally, minor amounts of non-conjugated diolefins, preferably $C_6$-$C_{20}$ diolefins. In one embodiment, the α-olefin can contain cyclic structures that are fully saturated such that the α-olefin monomer does not-contain a cyclic moiety with any olefinic unsaturation or any aromatic structures. Preferred α-olefins are mono-olefins. These propylene copolymers with prescribed range of comonomer levels are preferably prepared by polymerization of the suitable olefins in the presence of supported or unsupported metallocene or similar catalyst systems.

When the propylene-based compatible polymer either consists of or contains one or more copolymers, such copolymers are preferably composed of propylene as a main monomer and an α-olefin other than propylene as the co-monomer. The content of the propylene is generally 70 mole percent or more, often 80 mole % or more, frequently 90 mole % or more and sometimes 98 mole % or more. The polypropylene copolymer of the present invention preferably comprises a random crystallisable copolymer having a narrow compositional distribution such as can be produced by metallocene or the like catalysts.

Many copolymers of ethylene are also useful as high melt flow compatible polymers in the process of the present invention. For example single site catalysed polymers such a metallocene catalysed polyethylene and ethylene.

The polymer blends preferably include (a) at least one polymer having an MFI of greater than 10, preferably greater than 20, more preferably greater than 30, even more preferably greater than 50, the polymer preferably being an ethylene or propylene or butene homo or α-olefin interpolymer and preferably produced with a metallocene or similar catalyst which will display narrow composition distribution, meaning that the fractional comonomer content from molecule to molecule will be similar; and (b) at least one high melt flow compatible polymer, preferably an ethylene, propylene or butene homo or α-olefin interpolymer having a melt flow rate of greater than 100 and preferably produced using a metallocene or similar catalyst All references to metallocene catalysts shall include other catalysts (e.g. single-site and constrained geometry catalysts) capable of producing polymers having properties the same as or similar to metallocene-produced polymers (e.g. narrow or broad MWD, narrow composition distribution,). Such blends can optionally include additives well known to those skilled in the art, and may include amongst others, additives that reduce the water vapour and/or oxygen transmission rates of the polymers in which they are incorporated. For example, and as described in WO/02/074854 which is incorporated by reference, the addition of between 0.5% and 3% of a low MW hydrogenated aliphatic resin such as poly (dicyclopentadiene) may reduce the normalised moisture vapour transmission and sometimes the $O_2$ transmission rate of the blend and articles made therefrom.

Polyethylene, as used herein, can be a homopolymer or a copolymer and includes ethylene plastomers, VLDPE, LLDPE, LDPE, and HDPE. Ethylene plastomers, as used herein, refers generally to a class of ethylene based copolymers with density of less than about 0.915 g/cc (down to about 0.865 g/cc). Ethylene plastomers have an ethylene crystallinity between plastics (i.e. linear low density and very low density polyethylenes) and ethylene/α-olefin elastomers. VLDPE is very low density polyethylene, typically having a density in the range of from 0.90 to 0.915 g/cc. LLDPE is linear low density polyethylene, typically having a density in the range of from 0.915 to 0.930 g/cc. LDPE is low density polyethylene, typically having a density in the range of from 0.915 to 0.930 g/cc. HDPE is high density polyethylene, typically having a density in the range of from 0.930 to 0.970 g/cc.

Although PCT/AU98/00255 advises that "a wide variety of polypropylene polymers possessing a very, wide range of MFIs (1-200+), densities and crystallinities will produce blends suitable for use in the process of the present invention", it does not describe any particular advantages to be derived from the incorporation of at least one compatible polymer of any nature, including polypropylene polymers, with high MFIs. and indeed gives no examples of compatible polymers with an MFI greater than 100.

The compatible polymer largely forms the disperse or co-continuous phase of the blends of the present invention. It has now been found that, surprisingly, the incorporation of at least one high melt flow compatible polymer in formulations for the manufacture of a flexible thin walled article frequently has a number of significant advantages relative to the use of the same compatible polymer(s) but with a low MFI. It has also been found that provided the molecular weight of fine at least one compatible polymer doesn't fall below a value beyond which its ability to improve the ESCR and/or tear strength in the direction of the polymer flow of the moulded blend is negated, the incorporation of high MFI compatible polymers into the blend has a number of significant advantages relative to the incorporation of low MFI grades of the same compatible polymer. For example, the high melt flow compatible polymer frequently has the effect of increasing the shear sensitivity and overall MFI of the whole blend, thereby improving its flow properties. Also, because there is usually an inverse relationship between MFI and some physical properties of polymers, it is frequently found that polymer properties such as flex modulus and hardness decrease with increasing MFI. When it is desired, for example for reasons of cost, ESCR effectiveness, etc., to use as a particular compatible polymer, but the low MFI grades of that polymer (i.e. polymers with MFIs ≤100) have a flex modulus that is too high relative to the desired application and which results in mouldings and that arc too stiff, the substitution of a high MFI chemically similar or identical compatible polymer for all or part of the compatible polymer with an MFI of ≤100 in a blend enables the production and use of blends with much higher MFI than were previously attainable while at the same time reducing the adverse impact on properties such as 'feel' and higher flex modulus that would normally be associated with lower MFI grades of the compatible polymer. Depending on the desired properties of the moulded article, the high melt flow compatible polymer can be used either as the sole compatible polymer in a blend or may be blended with other MFI compatible polymers, which may be either high or low MFI compatible polymers.

Without wishing to be bound by theory, it is believed that the interaction between the polymer and the compatible polymer, and particularly a high melt flow compatible polymer forms regions within the moulded articles which can be regarded as "joints". These "joints" appear to absorb or disperse stresses in articles made from the polymer blend. The presence of these "joints" interspersed within the article appears to absorb or dissipate the stresses within the article which would otherwise result in decreased physical properties. It is believed that the benefits obtained from the use of at least one high melt flow compatible polymer are due primarily to their being more effectively dispersed in the at least one compatible polymer relative to lower MFI versions of the same compatible polymer and that they enable the formation of more and smaller disperse phase particles sizes relative to that attainable with low MFI versions of the same polymer. In general, the higher the MFI of the compatible polymer, the smaller the particle size that it can form, although there will be an MFI (and hence MW) beyond which reducing the MW further will not result in further reductions in high melt flow compatible polymer particle size. The smaller particle size of the disperse phase in turn results in an increase of the total surface area of a given weight percentage of the compatible polymer, thereby enabling a greater number of joints and areas of interaction between the polymer and the disperse phase (i.e. the compatible polymer) of the blend. The effect of reducing the particle size of a compatible polymer on the number of particles of the compatible polymer in the blend is illustrated by the fact that for a given weight % of a compatible polymer in a blend, halving the particle size (eg. by halving the particle radius) of the compatible polymer increases the number of compatible polymer particles by a factor of 8 and the total surface area of the compatible polymer by a factor of 2. Thus halving the radius of the particles of compatible polymer increases the number of stress-relieving 'joints' within the moulding by a factor of 8 and the surface area of the interface between the compatible polymer and the polymer by a factor of 2. Both these increases have the potential effect of improving moulding properties such as ESCR and tear strength.

Again without wishing to be bound by theory, we believe that the increase in particle numbers and surface area of the compatible polymer of the discontinuous phase is one of the key reasons for many of the property improvements (eg, ESCR, tear strength) of the invention. The improvements in ESCR etc; resulting from the incorporation of high MFI compatible polymers often enables the percentage of compatible polymer in a blend to be reduced while still attaining an acceptable ESCR etc. This may be advantageous, for example where it is desirable to reduce the amount of a polypropylene compatible polymer in a blend in order to reduce the flex modulus of said blend. Alternatively, and using the same example, maintaining the weight % of the high melt flow compatible polypropylene results in significant increase in the number of disperse phase particles relative to a low MFI equivalent polypropylene which in turn increases the overall ESCR of the blend. This ESCR improvement in turn enables the use of higher MFI polymers, thereby increasing the blend's processing characteristics while maintaining acceptable ESCR performance.

Without wishing to be bound by theory, we believe that the interfacial tension between two immiscible polymers decreases with decreasing molecular weight, so that as the MFI of the disperse phase increases so does the compatibility between the polymers until they become miscible For each type of compatible polymer there will be an upper limit on how high it's MFI (i.e. how low its molecular weight) can be before it starts to unacceptably degrade the performance of a particular blend for use in a particular application. This upper limit will vary, depending on the characteristics of the particular compatible polymer (e.g. homopolymer or copolymer PP, ionomer etc.), the properties of any other compatible polymers in the blend as well as the characteristics of the polymer(s) and the interaction between them as well as the end use of the moulded product (eg. what is intended to be packed into the product), and can be determined by experimentation. For some applications some degradation of some characteristics of a particular blend due to the incorporation of one or more high MFI compatible polymers relative to the same blend but with a low MFI version of the same compatible polymer may be acceptable in order to achieve the benefits of the improvement of other properties of the blend that result from their incorporation. Again, the limits on how high the MFI of the high melt flow compatible polymer can be as well as the level of incorporation that can achieved before the blend performance is degraded to an unacceptable level can be determined by experiment.

The high melt flow compatible polymer may be directly produced in a reactor using appropriate catalysts (including metallocenes or similar catalysts) and processing conditions. The high melt flow compatible polymer may also be prepared by 'cracking' lower MFI polymers of the same type by means of various peroxides or other molecular chain-cutting polymers known to those skilled in the art. For example, a 50 MFI polypropylene homopolymer or copolymer may be converted into a high MFI (e.g. a 300, 500, 1,000 or 1500 MFI) polypropylene homopolymer or copolymer by means of cracking it. The cracking required to produce a high melt flow compatible polymer of a particular MFI can be achieved prior to incorporation of the high melt flow compatible polymer into the polymer, thereby producing a high melt flow compatible polymer ready for incorporation into the blend. Alternatively, the high melt flow compatible polymer may be produced in situ in the blend by incorporating into and/or coating the compatible polymer with an appropriate amount and type of a cracking agent capable of cracking the polymer to the required MFI, adding the thus prepared compatible polymer/cracking agent combination to one or more of the other blend components and processing the resultant blend under conditions (usually a high enough temperature) sufficient to enable the cracking agent to reduce the MW (molecular weight) of the compatible polymer to a level mat will result in the desired MFI of the compatible polymer. If this latter method of achieving the high melt flow compatible polymer is used, it is necessary to assess the impact, if any, of the cracking agent on the other blend components during processing (ie. to assess for any unintended cracking or cross-linking of the other blend components by the cracking agent), and if necessary to adjust the blend formulation to correct for the consequences of these effects on the overall properties of the blend. A further method of producing blends of the present invention containing a high melt flow compatible polymer as the disperse phase within a continuous or co-continuous phase of a polymer is to produce a reactor blend of the high melt flow compatible polymer and polymer. This may be achieved by a number of means that are well known to those skilled in the art. For example, the high melt flow compatible polymer and polymer may be produced in a single reactor in the presence of appropriate catalysts. Alternatively they may be produced in parallel or series in two or more reactors, or one polymerized component may be added in its finished state to a reactor in which the other component is being produced.

Some preferred properties of the final composition when moulded include high tensile strength, flexibility and tear strength. The extractables content for the compositions of the invention and mouldings therefrom is preferably less than or equal to 2.0 wt %. more preferably less than or equal to 1.6 wt %, most preferably less than or equal to 1.4 wt % as measured by ASTM D-5227.

Similar to the function of compatible agents as described in PCT/AU98/00255, the high melt flow compatible polymer of this aspect of the present invention is used in an amount at least sufficient to improve the environmental stress crack resistance and/or tear resistance, as measured by the Cullwing tear test, of the polymer blend. The high melt flow compatible polymer may also be used in amounts in excess of those required to compatibilise the polymer blend in order to improve the viscosity characteristics of said polymer blend so as to optimise the moulding characteristics of said polymer blend and/or general properties of the moulded product such as softness and flexibility. Typically, the high melt flow compatible polymer is used in an amount of from about 2 to about 40 weight percent of the polymer blend, although lower or higher amounts may be used in certain polymer blends. The optimum amount for a specific formulation will depend on the properties required and can be determined by experimentation. Further it has been found that inclusion of percentages of high melt flow compatible polymers that are greater than necessary for increasing the environmental stress crack resistance of the polymer blend will often also enable the improvement of the polymer blend properties such as tear and impact strength, barrier properties, chemical resistance, processing and product feel. For example, the incorporation of greater than necessary percentages of a polypropylene-based high melt flow compatible polymer to improve the environmental stress crack resistance of a polyethylene-based polymer blend to the desired level may improve the Chemical resistance and general barrier properties, and reduce the water vapour and water transmission rate of the polymer blend compared to polymer blends containing the minimum amount of polypropylene-based high melt flow compatible polymer required to improve the environmental stress crack resistance only. The properties of such blends of the high melt flow compatible polymer of the present invention may further be modified by the selection of suitable grades of the high melt flow compatible polymer and/or the polymer components to achieve the desired final properties. For example, where it is desired to have a polymer blend containing a relatively high percentage of polypropylene-based polymers, blend properties such as the 'feel', 'softness', impact resistance (especially low-temperature impact resistance), elongation-to-break, tear resistance and/or retortability of such a blend may be substantially modified by utilising a relatively low percentage of low-flex-modulus polymers as the polyethylene-based components of the blend. Examples of suitable low-flex-modulus polyethylene-based polymers include low flex modulus plastomers such as DuPont-Dow Engage 8401 plastomer and some of Mitsui's Tafmer XR propylene/α-olefin copolymers. Further, it has been found that the inclusion of greater than necessary percentages of the high melt flow compatible polymer may enable the incorporation of greater percentages of other polymers than would otherwise be consistent with this invention. Thus, using the high melt flow compatible polymer in such quantities may enable the incorporation of greater-than-otherwise-possible amounts of such beneficial, essentially incompatible other polymers such as nylons and EVOH, with concomitant improvements in properties such as tear and impact strength, barrier properties, chemical resistance and product feel.

The high melt flow compatible polymer containing polymer blend may also incorporate a variety of other additives. Examples of additional additives include further polymers, slip agents, anti-tack agents, pigments, dyes, fillers, antioxidants, plasticisers, UV protection, viscosity modifying polymers, additives (some of which may themselves be polymers) capable of reacting with or absorbing deleterious chemicals such as oxygen and other mould release polymers and melt strength modifiers amongst others. Additionally, compatibilisers that improve various properties of the blends, such as weld line strength, compatibility between the polymer and high melt flow compatible polymer, disperse phase particle size reduction, ESCR, tear strength, etc., may be added to the blends. The abovementioned and other suitable additives may be added to one or more components of the polymer blend or the polymer blend as a whole prior to moulding in order to modify its properties to suit specific-applications or to achieve specific effects in the end product. In cases where one or more of the additives is itself a polymer, for example in the case of some oxygen-scavenging systems, said polymer may be the polymer or compatible polymer of the polymer blend. Non-polymer additives may be compatible polymers of the polymer blend.

A wide variety of polymers may be used as the polymer in blends with the high melt flow compatible polymer of the present invention. These polymers include olefin borne-polymers and copolymers, preferably ethylene or propylene or butene homopolymers and copolymers with $C_3$-$C_{20}$ α or beta olefins and/or polyenes, preferably $C_3$-$C_8$ α or beta olefins, such polymers having densities ranging from very low to high density (density ranges between 0.85 and 0.97 g/cm$^3$). Also suitable for use in the present invention are ethylene, propylene and butene copolymers with terminal vinyl groups and ethylene, propylene and butene copolymers containing greater than 50% ethylene, propylene or butene which are copolymerised with comonomers such as methyl acrylates, ethyl acrylates, acrylic acid, methacrylic acid and other polar comonomers, ionomers, styrene-ethylene/butene-styrene ABA copolymers, styrene, halo- or alkyl substituted styrenes or other vinylidene aromatic monomers and/or one or more hindered aliphatic or cycloaliphatic vinylidene monomers, tetrafluoroethylene, vinylbenzocyclobutane, and naphthenics (e.g., cyclopentene, cyclohexene and cyclooctene). These polymers may be made by a wide variety of methods including high and low pressure processes, using a wide variety of catalysts such as Ziegler-Natta and metallocenes, and have molecular Structures ranging from linear to highly branched, thus included are LDPE, MDPE and HDPE. Particularly suitable for use in the present invention are plastomers, 'substantially linear' and branched polyethylenes or polypropylenes, copolymers of propylene and ethylene-or one or more α-olefins, terpolymers of ethylene, propylene and one or more α-olefin (of which Montell's Catalloy polymers are an example) and polymers and copolymers of propylene manufactured using metallocene or similar catalysts and which are characterized by a super random distribution of the copolymers. Random propylene copolymers are suitable for the production of flexible thin-walled mouldings, particularly when improved optical clarity is required. Other polymers suitable for use in the present invention include polylactic acid polymers, other suitable biodegradable polymers and polyketones, ethylene carbon monoxide copolymers (ECO), ethylene/propylene carbon monoxide polymers (EPCO), linear alternating ECO copolymers such as those disclosed by U.S. Ser. No. 08/009,198, the disclosure of which is incorporated herein by reference, recycled polyethylene (e.g., post consumer recycled high density polyethylene recovered from waste bottles).

As exemplified in JP 07316356, JP 07316355 and TP 07330982 which are incorporated herein by reference, blends of crystalline PP in combination with ethylene/styrene/α-olefin elastomers may be suitable as a polymer for the production of flexible thin walled articles.

Also suitable for use as polymers are linear or branched isotactic polymers, particularly polypropylene and polybutene homopolymers or random copolymers which have a structure in which their tacticity varies within the range of between 25 and 60% of [mmmm] pentad concentration. This variation in tacticity is due to the statistic distribution of stereoscopic errors in the polymer chains. Such polymers are described in, amongst others, WO 01/27169 (P&G), WO/99/52955 (Rieger) and WO 99/52950 and (Rieger) which are hereby incorporated by reference. The terra "stereoscopic error" refers to a stereoscopic sequence, typically but not exclusively characterized by a [mrrm] pentad, which has been introduced into a polymer in which a different pentad (eg. [mmmm] (isotactic) or [mrmr] (syndiotactic) characterises the polymer. These stereoscopic errors change the characteristics of the polymer—for example, an isotactic PP with stereoscopic errors tends to have more elastomeric properties than the same polymer without stereoscopic errors. The term "tacticity" is measure of the orderliness of the succession of configurational repeating units in the main and/or side chains of a polymer molecule.

Also suitable for use in the present invention are linear or branched isotactic polymers having an arbitrary or rather regular sequence of isotactic and atactic blocks within the polymer molecules, such as are described in WO/99/29749 (ExxonMobil), which is hereby incorporated by reference. WO/99/2949 describes a branched polyolefin having crystalline sidechains and an amorphous backbone wherein at least 90 mole percent of the sidechains are isotactic or syndiotactic polypropylene and at least 80 mole percent of the backbone is atactic polypropylene.

Polymers with reduced tacticity such as are described above may have particular utility in blends as at least one compatible polymers in blends in which the at least one polymer is a crystalline or semi-crystalline PP. This will be particularly the case when the polymer(s) in question has a relatively low flex modulus as it acts to reduce the flex modulus of the blend with a crystalline or semi-crystalline PP at least one polymer, and increasing the tear resistance, flex modulus and impact resistance of the blend.

Recent developments in polypropylene polymerisation technology have application for injection moulded flexible thin walled mouldings. One such development is the ability to produce very flexible, soft and elastic polypropylene polymers with minor percentage of ethylene copolymer and essentially no diene. These polymers have limited crystallinity due to adjacent isotactic propylene units and have a relatively low melting point. They are generally devoid of any substantial intermolecular heterogeneity in tacticity and comonomer composition, and are substantially free of diene. They are also devoid of any substantial heterogeneity in intramolecular composition distribution. The ethylene copolymer includes lower limit of 5% by weight ethylene-derived units to an upper limit of 25% by weight ethylene-derived unite. Within these ranges, these copolymers are mildly crystalline as measured by differential scanning calorimetry (DSC), and are exceptionally, soft, while still retaining substantial tensile strength and elasticity. Such polymers are described in U.S. Pat. No. 6,525,157 (ExxonMobil).

Recent developments have resulted in the synthesis of partially atactic, partially isotactic polypropylene polymers which have elastomeric properties. It is believed that in these components each molecule consists of portions which are isotactic, and therefore crystallisable, while the other portions of the same, polypropylene molecule are atactic and therefore amorphous. Such polymers are be suitable for injection moulded flexible thin walled mouldings, either as the at least one polymer or the at least one compatible polymer in blends in combination with other polymers, such as polyethylenes, polypropylenes and/or α-olefin copolymers thereof. Examples of these propylene homopolymers containing different levels of isotacticity in different portions of the molecule are described by in, amongst others, U.S. Pat. No. 5,594,080 (Waymouth), in Journal American Chemical Society (1995), Vol. 117, page 11586, and in the Journal American Chemical Society (1997), Vol. 119, page 3635.

Especially when polymers such as are described in the P&G, Rieger, Waymouth and ExxonMobil patents are incorporated in blends having have an MFI greater than 10, preferably greater than 20 more preferably greater than 30 and most preferably greater than 50, and still more preferably the polymers themselves have an MFI greater than 10, preferably greater than 20 more preferably, greater than 30 and most preferably greater than 50. they may be used either as the sole polymer or as a compatible polymer or high melt flow compatible polymer and may have either narrow or broad molecular weight distribution. Polymers such as are described above are often particularly suited to the production of flexible thin walled articles relative to the equivalent polymers of higher tacticity because their relatively reduced tacticity results in polymers with reduced rigidity and increased flexibility and elasticity. If the polymers) is used as a compatible polymer or high melt flow compatible polymer, it is advantageous, though not necessary, that it is used in conjunction with at least one polymer that is made from the same monomer(s) as the compatible polymer or high melt flow compatible polymer because this results in greater compatibility/stability between the polymer(s) as well as allowing for easier recycling of injection moulded flexible thin walled articles produced from such blends. For example, if the polymer is a polypropylene homopolymer or copolymer with tacticity varying between 25 and 60% of [mmmm] pentad concentration, it can be blended with a polypropylene homopolymer or copolymer with a higher tacticity to produce a blend suitable for use in flexible thin walled articles. Alternatively, these polymers may be used in conjunction with other polymers to form blends that are suitable for use to manufacture flexible injection moulded thin walled articles. For example, these polymers may be blended with polyethylenes and copolymers of different types, including LDPE, MDPE and HDPE, which in turn may be manufactured using a variety of different manufacturing techniques, catalysts and copolymers such as are described in PCT/AU98/00255 and herein. Preferably, the polyethylene is manufactured using metallocene or similar catalysts.

In many blends suitable for the present invention, it is advantageous to incorporate at least two polymers into blends, with at least one polymer having a higher crystallinity, and preferably a higher MFI, than the at least one other polymer. It is preferable, though not essential, that the higher crystallinity polymer has a crystallinity that is at least 5% greater, and preferably 10% or more greater than the crystallinity of the at least one other polymer. The high crystallinity polymer may be made by a variety of methods using a variety of catalysts including metalloceue, Ziegler Natta, constrained geometry catalysts, or may be produced by a free radical reaction process, and may be linear, substantially linear or branched in structure. In blends in which a high crystallinity polymer is incorporated with an at least one lower crystallinity polymer (which is preferably a metallocene polymer), better ESCR results are often obtained when the high crystallinity polymer has a broad MWD (molecular weight distribution). A broad MWD (i.e. multi modal) high crystallinity polymer can be produced by a variety of methods. These include:
1) Intimately blending two or more polymers having different MFIs in appropriate blending equipment;
2) Producing bi or multi modal polymers by means of 'tandem' reactors; and
3) Producing bi or multi modal polymers in a single reactor using appropriate catalysts.

We have found that plastomers, substantially linear polyethylenes, metallocene branched polyethylenes and copolymers of the aforementioned ethylene polymers, propylene α-olefin interpolymers and metallocene propylene polymers and interpolymers are preferred polymers for use in the present invention for the production of thin-walled products, and especially for the. production of flexible thin walled articles. A key characteristic of plastomers, substantially linear polyethylenes. metallocene branched polyethylenes and copolymers of the aforementioned ethylene polymers, propylene α-olefin interpolymers and metallocene propylene polymers and interpolymers is their composition distribution ie. the uniformity of distribution of comonomer within and among the molecules of the polymer. Another advantage of such catalysts is that the degree of molecular branching within and between the molecules of the polymers produced by them is more uniform than is obtained using conventional catalysts. For example, conventional Ziegler-Natta catalysts generally yield copolymers having a considerably broader composition distribution—and in the case of copolymers the comonomer distribution in polymers thus produced will vary widely among the polymer molecules, and will also be less randomly distributed within a given molecule. Also, the degree of long chain branching is more consistent between molecules produced by metallocene or similar catalysts than are produced by Z-N or similar catalysts.

These polymers may advantageously have a molecular weight distribution in a ratio Mw/Mn range of 1.5-30, preferably in the range of 1.8-10 and more preferably in the range 2-4. Generally, plastomer, substantially linear or branched ethylene or propylene polymers comprise ethylene or propylene homopolymers and interpolymers of ethylene and/or propylene, with at least one $C_3$-$C_{20}$ α-olefin copolymer being especially preferred. The term "interpolymer" is used herein to indicate a copolymer or a ter polymer or the like. That is, at least one other comonomer is copolymerised with ethylene or propylene to make the interpolymer α-olefins.

When the polymer is a plastomer, substantially linear or branched polymer in which propylene or butene constitutes over 50% of the polymer, the MFI of the propylene or butene α-olefin copolymer may be higher than is generally acceptable for flexible thin-walled injection moulded articles when ethylene α-olefins constitute the polymer, due to propylene and butene α-olefins generally possessing better inherent ESCR properties at the same MFI compared to most ethylene α-olefins. Thus, many propylene and butene α-olefins, particularly those prepared by metallocene or similar catalysts, can have MFIs up to and greater than 200 and still produce acceptable flexible thin walled articles with good ESCR when used as the at least one polymer and/or at least on compatible polymer. The optimum MFI for a particular propylene or butene α-olefin polymer can be determined by experimentation by one skilled in the art, but will preferably be >30, more preferably >50, and generally >100 and possibly >150. α-olefins suitable for copolymerisation with propylene or butene to produce propylene or butene α-olefins suitable for the present invention include α-olefins in the range of about 2 to about 20 carbon atoms, preferably in the range of about 3-16 carbons, most preferably in the range of about 2-8 carbon atoms. Illustrative non-limiting examples of such α-olefins are ethylene, propylene, 1-butene, 1-pentene, 4-methyl-1-pentene, 1-hexene, 1-octene, and 1-dodecene and the like. Polyene comonomers suitable for the copolymerisation with propylene or butene to form propylene or butene copolymers suitable for the present invention have, in the main, about 3 to 20 carbon atoms, preferably in the range of about 4 to about 20 carbon atoms, most preferably in the range of about 4 to about 15 carbon atoms. In one embodiment the polyene is a diene that has in the range of about 3 to about 20 carbon atoms, and may be a straight chained, branched chained or cyclic hydrocarbon diene. Preferably the diene is a non-conjugated diene. Non-limiting examples of propylene or butene /α-olefin plastomers suitable for the present invention include propylene or butene/butene-1, propylene or butene/hexene-1, propylene or butene/octene-1 and propylene or butene /ethylene copolymers. Non-limiting examples of terpolymer propylene or butene plastomers suitable for the present invention include ethylene/propylene or butene/1,4 hexadiene and propylene or butene/octene-1/1,4-hexadiene. Copolymers of propylene or butene with other α-olefins having 2 to 8 carbon atoms that are particularly useful for the present invention are copolymers comprising propylene or butone and ethylene as indispensable components (monomer units) as well as copolymers of propylene or butene with ethylene and at least one α-olefin having 4 to 8 carbon atoms usable herein include, for example, 1-butene, 3-methyl-1-butene, 1-pentene, 4-methyl-1-pentene, 1-hexene, and 1-octene. Further, the copolymer may contain as a comonomer 0.5 to 10% by weight of a nonconjugated diene, such as 1,4-hexadiene, 5-methyl-1,5-hexadiene, 1,4-octadiene, cyclohexadiene, cyclooctadiene, dicyclopentadiene, 5-ethylidene-2-norbornene, 5-butylidene-2-norbornene, or 2-isopropenyl-5-norbornene. Preferably these copolymers are prepared using metallocene or similar catalysts. The percentages of ethylene and/or other α-olefins copolymerised with propylene or butene to form polymers suitable for the present invention can be varied widely, depending on the desired properties of the mouldings made from blends of these materials. In general, the higher the percentage of ethylene and/or α-olefin copolymer polymerised with the propylene or butene, the lower the flex modulus of the resultant polymer and so the more flexible the mouldings made from them will be in which said polymers constitute the polymer of the blend.

U.S. Pat. No. 6,355,736, which is hereby incorporated by reference, describes a propylene block copolymer composition comprising (A) a propylene-α-olefin random copolymer with a propylene content of 99.4 to 99.9 mol % and (B) a propylene-α-olefin random copolymer with a propylene content of 35 to 60 mol %. It further describes propylene block copolymer compositions wherein the content of the propylene-α-olefin random copolymer (B) is from 22 to 40% by weight, based on the weight of the propylene block copolymer composition. Such propylene block copolymers are suited for use as the polymer component and/or the high melt flow compatible polymer in the present invention.

U.S. Pat. No. 6,458,901, which is hereby incorporated by reference, describes propylene copolymers suitable for use as the polymer component and/or the high melt flow compatible polymer suitable for use in the present invention. The propylene copolymers described comprise propylene, at least one olefin selected from the group consisting of olefins having 2 to 20 carbon atoms except propylene, and a cyclic olefin, and are characterized in that the total number of carbon atoms of the monomers except the cyclic olefin is at least 7. The incorporation of cyclic olefins into polymers consisting of propylene, at least one olefin selected from the group consisting of olefins having 2 to 20 carbon atoms except propylene results in the improvement of the heat resistance of the resultant polymer. The propylene copolymer preferably contains 0.01 to 20% by mole, more preferably 0.05 to 15% by mole, particularly preferably 0.1 to 10% by mole, most preferably 0.15 to 5% by mole, of the cyclic olefin. When the propylene copolymer of the present invention comprises ethylene (the olefin having two carbon atoms), the content of ethylene is preferably 80% by mole or less, more preferably 70% by mole or less, particularly preferably 60% by mole or less, most preferably 50% by mote or less, from the viewpoint of the improvement of flexibility of the thermoplastic resin composition.

The short chain branch distribution index (SCBDI) is defined as the weight percent of molecules having a comonomer content within 15% of the median total molar comonomer content. The SCBDI of the propylene polymers suitable for the present invention is preferably greater than about 30%, and especially greater than about 50%, with figures of 70% or more being achievable.

Unless otherwise stated, when a copolymer is described as having a certain percentage of a particular monomer in its composition, for example a propylene/ethylene copolymer with 5% ethylene, it means that the copolymer consists of 5% by weight of ethylene-derived units out of the sum of the weights of propylene and ethylene-derived units, in this particular case this being 100%.

Unless otherwise stated, MWD (molecular weight distribution) means the ratio of the weight average molecular weight to the number average molecular weight, i.e. Mw/Mn.

Unless otherwise stated, 'crystallisable' (eg. as used in 'propylene/ethylene copolymer with isotactic propylene crystallisable sequences') means that a particular polymer or blend has generally crystallisable sequences of a particular type (eg. isotactic propylene) which may be identified by the heat of fusion characteristic of the particular crystallisable sequences as highlighted in DSC analysis.

Examples of blends utilising the benefits of the addition of a high melt flow compatible polymer into the polymer are clearly illustrated by the following examples:

EXAMPLE 1

A 25:37.5:37.5 blend of SC973;Engage 8401:WSM 168 was injection moulded into tubes and the ESCR tested. SC973 is the compatible polymer in this formulation, and is a 100 MFI PP obtained from Basell. This formulation had a ±30% ESCR failure rate after 360 hours.

EXAMPLE 2

A 25:37.5:37.5 blend of Atofina 3960:Engage 8401:WSM 168 was injection moulded into tubes and the ESCR tested. Atofina 3960 is the compatible polymer in this formulation, and is a 350 MFI PP obtained from Atofina. This formulation showed a 0% ESCR failure rate after 360 hrs as well as significantly improved clarity relative to the comparative formula.

The only difference between the formulations of Examples 1 and 2 is the substitution of the high melt flow compatible polymer approximately chemical equivalent, of the compatible polymer for the compatible polymer, with the key difference between them being the much higher MFI of the high melt flow compatible polymer relative to the compatible polymer. The significant improvement in ESCR performance is due to the much higher MFI (i.e. much lower MW) of the high melt flow compatible polymer relative to the compatible polymer.

Examples of blends according to the second aspect of the invention will now be described. It will be understood that the percentages of the various types of blend components illustrated in these example may be varied depending on the desired properties of the mouldings produced therefrom, and that the range of percentages of the types of blend components that will produce acceptable mouldings may be determined by experimentation.

EXAMPLE 3

70% propylene/butene copolymer with a butene content of 15%, an MFI of 50 and a MWD of <4 and made by 8 metallocene/single site catalyst.

30% Exact 4038, a 125 MFI 0.885 density ethylene/butene copolymer from ExxonMobil. .

This example illustrates the incorporation of a high MFI mPE compatible polymer into a propylene/α-olefin copolymer, and which is suitable for the manufacture of thin-walled flexible articles.

EXAMPLE 4

70% propylene/octene copolymer with an octene content of 20%, an MFI of 30 and a MWD of <4 and made by a metallocene/single site catalyst 30% of Fina 3960, a 350 MFI PP homopolymer from Atofina.

This example illustrates the incorporation, of a high MFI PP compatible polymer into a propylene/octene α-olefin copolymer, and which is suitable for the manufacture of thin-walled flexible articles.

EXAMPLE 5

70% propylene/ethylene substantially linear copolymer with an ethylene content of 25%, an MFI of 50 and a MWD of <4 and made by metallocene/single site catalysts.

30% of Fina 3960, a 350 MFI PP homopolymer from Atofina.

This example illustrates the incorporation of a high MFI PP compatible polymer into a substantially linear propylene/ ethylene α-olefin copolymer, and which is suitable for the manufacture of thin-walled flexible articles.

EXAMPLE 6

80% propylene/butene copolymer plastomer with an butene content of 30%, an MFI of 70 and a MWD of <4 and made by a metallocene/single site catalyst.

10% of a 50 MFI isotactic or syndiotactic PP homopolymer made using a metallocene/single site catalyst.

10% of Fina 3960, a 350 MFI PP homopolymer from Atofina.

This example illustrates the incorporation of a high MFI PP and a low MFI PP compatible polymer into a propylene/ butene α-olefin copolymer plastomer, and which is suitable for the manufacture of thin-walled flexible articles.

EXAMPLE 7

90% propylene/butene copolymer with an butene content of 30%, an MFI of 70 and a MWD of <4 and made by a metallocene/single site catalyst.

30% of a 500 MFI polyethylene or ethylene α-olefin copolymer made with a metallocene catalyst This example illustrates the incorporation of a high MFI polyethylene or ethylene α-olefin copolymer as the compatible polymer in combination with a propylene/butene α-olefin copolymer. The α-olefin percentage in the copolymer may be varied from 0.5% to 49% depending on requirements of the end use.

EXAMPLE 8

90% propylene/butene copolymer with a butene content of 30%, an MFI of 150 and a MWD of >4 and made by a metallocene/single site catalyst.

10% of a 500 MFI polyethylene, preferably made by a metallocene/single site catalyst.

This example illustrates the incorporation of a high MFI polyethylene as the compatible polymer in combination with a high MFI polypropylene compatible polymer.

EXAMPLE 9

40% propylene/ethylene copolymer with a density of 0.86 and reduced isotacticity, and MFI of 14 such as Vistamaxx 1120 (ExxonMobil) 60% of Fina 3960, a 350 MFI PP homopolymer from Atofina.

This example illustrates the incorporation of a high crystallinity, high MFI PP polymer into a propylene/ethylene α-olefin copolymer with altered tacticity and reduced isotacticity, and which is suitable for the manufacture of thin-walled flexible articles.

EXAMPLE 10

30% propylene/ethylene copolymer with an MFI of 14, a density of 0.86 and altered tacticity such as Vistamaxx 1120.

30% of a 50 MFI isotactic or syndiotactic PP random copolymer and

40% of Fina 3960, a 350 MFI PP homopolymer from Atofina.

This example illustrates the incorporation of a high MFI PP and a low MFI propylene/ethylene copolymer with statistic distribution of stereoscopic errors together with a PP random copolymer. This blend is suitable for the manufacture of thin-walled flexible articles and which has improved clarity and a lower tendency to stress whiten due to the incorporation of the random copolymer in place of some of the PP homopolymer.

EXAMPLE 11

35% propylene/ethylene copolymer with stereoscopic errors having an MFI of 300, density of 0.86 and a flex modulus (1% secant) of approximately 13 MPa 65% 100 MFI random PP copolymer This example illustrates the incorporation of a very high MFI propylene/ethylene copolymer with stereoscopic errors in a readily available grade of prior art random PP copolymer to produce a relatively high MFI blend that is suitable for the manufacture of thin walled flexible articles.

EXAMPLE 12

35% propylene/ethylene copolymer with stereoscopic errors having an MFI of 300, density of 0.86 and a flex modulus (1% secant) of approximately 13 MPa 40% 100 MFI random PP copolymer 25% 100 MFI PP copolymer such as Basell's SC973

This example illustrates the incorporation of a very high MFI propylene/ethylene copolymer with stereoscopic errors in a readily available grade of prior art random PP copolymer and a readily available grade of prior art PP copolymer to produce a relatively high MFI blend that is suitable for the manufacture of thin walled flexible articles.

Further to the above description, developments in the production of highly-branched polyolefins have enabled the production of star, comb, nanogel and other similar polymers. These polymers feature a plurality of polyolefin arms linked to a polymeric backbone to provide a highly branched structure in which the properties of the highly branched structure can be conveniently tailored to the application for which the polymer is used. The choice of specific reactive polymeric backbone and/or its manner of preparation controls the branched structure as to comb, star, nanogel or structural combinations thereof. That allows for the preparation of polymers having relatively low viscosities compared to their linear counterparts at the same absolute molecular weight. These polymer types and blends made therefrom may be particularly suitable for the production of injection moulded flexible thin walled mouldings. The rheological behaviour of these polymers with controlled branching shows surprising and useful features. These polymers frequently have a zero-shear viscosity that is larger than a linear polymer of the same molecular weight. They show a rapid drop in viscosity with shear rate (large degree of shear thinning) and a plateau modulus that is at least two times lower than that of prior art linear and branched polymers. This latter characteristic is especially surprising, since ethylene polymers of various types exhibit essentially the same plateau modulus. This was thought to be intrinsic to the monomer type and not dependent on polymer architecture. The lower plateau modulus means that the comb and similar polymers are much less entangled than the linears, thus giving them such low viscosity for their molecular weight. The utility of these properties of these polymers is that they have a very low viscosity for their molecular weights under melt processing conditions and so will process much more easily than the prior art polymers. Even when added in relatively small quantities to conventional blends suitable for injection moulded flexible thin walled mouldings, they can significantly improve blend processability. U.S. Pat. Nos. 6,355,757 and 6,084,030 amongst other patents describe the production of polymers such as are described above.

The copolymers of the above and similar inventions have utility in blends suitable for the production of injection moulded flexible thin walled mouldings, those blends comprising the branched copolymer of the inventions at a very wide range (eg. 0.1-99.9% weight percent), but most often between 1-5%. Depending on the properties of a specific highly-branched polymer of the above inventions and the desired properties of a particular formulation, said polymer may be used as a component of the at least one polymer or at least one compatible polymer part of the composition of the present invention. Depending on their properties they may also be regarded as additives rather than components of the polymer portion of the present invention.

Recent catalyst and process developments have enabled the production of a variety of polypropylene homo and copolymers possessing properties that make them particularly useful for the production of injection moulded flexible thin walled articles. Amongst these useful polymers are elastomeric PP homo and copolymers polymers produced by altering the tacticity of the polymer by. various means as well as the ability to produce low flex modulus PP α-olefin copolymers with relatively low percentages of α-olefin copolymers.

As examples of one of these recent developments are linear or branched isotactic polymer's, particularly polypropylene and polybutene homopolymers or random copolymers which have a structure in which their tacticity varies within the range of between 25 and 60% of [mmmm] pentad concentration. This variation in tacticity is due to the statistic distribution of stereoscopic errors in the polymer chains. Such polymers are described in amongst others, WO 01/27169 (P&G), WO 99/52955 (Rieger) and WO 99/52950 (Rieger). Similarly, propylene/ethylene copolymers of the types described in U.S. Pat. No. 6,525,157 (ExxonMobil) are suitable for use in injection moulded flexible thin walled mouldings. It is worth noting mat propylene α-olefins in which the number of Cs in the α-olefin is >4 have particular Utility for packaging requiring improved cold creep resistance relative to propylene α-olefins in which the number of Cs in the α-olefin is ≤4.

When the at least one polymer of a blend is a linear, substantially linear or branched polymer in which propylene or butene constitutes over 50% of the polymer, the MFI of the at least, one polymer homo or α-olefin copolymer may be higher than is generally acceptable when ethylene α-olefins constitute the at least one polymer due to propylene and butene homo or α-olefins generally possessing better inherent ESCR properties at the same MFI compared to most ethylene α-olefins. Thus some propylene and butene homo or α-olefin copolymers, particularly those prepared by metallocene or similar catalysts, may have MFIs up to and greater than 150 and still produce acceptable injection moulded flexible thin walled mouldings with good ESCR when used as the at least one polymer. The optimum MFI for a particular propylene or butene homo or α-olefin copolymer at least one polymer can be determined by experimentation, but will preferably be >30, more preferably >50 and, depending on the characteristics of the particular polypropylene or polybutene homo or α-olefin copolymer, may be even more preferably >100 and often >150. α-olefins suitable for copolymerisation with propylene or butene to produce propylene or butene α-olefins suitable for injection moulded flexible thin walled mouldings include α-olefins in the range of about 2 to about 20 carbon atoms, preferably in the range of about 2-16 carbons, most preferably in the range of about 2-8 carbon atoms. Further, the copolymer may contain as a comonomer 0.5 to 10% by weight of a nonconjugated diene, such as 1,4-hexadiene, 5-methyl-1,5-hexadiene, 1,4-octadiene, cyclohexadiene, cyclooctadiene, dicyclopentadiene, 5-ethylidene-2-norbornene, 5-butylidene-2-norbornene, or 2'isopropenyl-5-norbornene. Preferably these copolymers are prepared using metallocene or similar catalysts. The percentages of ethylene and/or other α-olefins copolymerised with propylene or butene to form polymers suitable for injection moulded flexible thin walled mouldings can be varied widely, depending on the desired properties of the mouldings made from blends of these materials. In general, the higher the percentage of ethylene and/or other α-olefin copolymer polymerised with the propylene or butene, the lower the flex modulus of the resultant polymer and so the more flexible the mouldings made from them will be in which said polymers constitute the at least one polymer of the blend.

Blends designed for recoverability and which contain a dispersed phase or co-continuous phase of a greater crystallinity and a continuous or co-continuous phase of lesser crystallinity such as are described below are suitable for the production of injection moulded flexible thin walled mouldings. The sizes of the individual domains of the dispersed phase in these blends are preferably very small. The components of the blend
i are also compatible to the extent that no compatibiliser needs to be added to attain and retain this fine morphology. One of the components is a polymer comprising predominately stereospecific polypropylene, preferably isotactic polypropylene. This is the component with greater crystallinity (an XPP). A second component is a copolymer of propylene and at least one $C_2$, $C_4$-$C_{20}$ α-olefin, preferably ethylene. This is the component with lesser crystallinity (an SXPP). In the copolymer the propylene is preferably polymerised substantially stereospecifically. Preferably the copolymer has a substantially uniform composition distribution, preferably as a result of polymerisation with a metallocene catalyst. Most preferably, said SXPP is an ethylene propylene copolymer, e.g. ethylene propylene semicrystalline elastomer.

It has been found that blending an at-least-one XPP and an at-least-one SXPP results in advantageous processing characteristics while still providing a composition having decreased flexural modulus and increased tensile strength, elongation, recovery and overall toughness. A third polymeric component which is another crystallizable propylene α-olefin copolymer (an SXPP2) has a crystallinity between those of the XP and SXPP. One type of PP blend suitable for injection moulded flexible thin walled mouldings comprises a crystalline isotactic or syndiotactic polypropylene (XPP) with a semi-crystalline α-olefin PP copolymer (SXPP) of the same tacticity as the XPP, preferably an ethylene propylene copolymer containing 4 wt. % to 35 wt. % α-olefin, preferably ethylene, and optionally a second propylene α-olefin copolymer with a crystallinity intermediate between the XPP and SXPP and preferably with similar tacticity. These blends have heterophase morphology. It is believed that this matching of stereoregularity increases the compatibility of the components and results in improved adhesion at the interface of the domains of the polymers of different crystallinities in the polymer blend composition. Narrow intermolecular and intramolecular compositional distribution in the copolymer is preferred, but not essential. These and similar blends may be particularly suitable for the manufacture of flexible injection moulded flexible thin walled mouldings and other containers that are subjected to heating by such methods as heat-filling with the product the container is required to contain and/or heat treating the filled container by methods such as retorting. Blend composition can vary widely depending on the application and may comprise 1% to 95% by weight of XPP and a SXPP with greater than 65 percent by weight propylene and preferably greater than 80% by weight propylene.

Polypropylene-based at least one polymer compositions that have low flex modulus have particular utility for-injection moulded flexible thin walled mouldings. The following are illustrations of some broad formulations that are capable of providing suitable low-flex-modulus PP compositions.

Formulation Type 1:
1. 8-25% crystalline PP or PP copolymer, most preferably 12-18%. If it is a copolymer, it should have at least 85% by weight of PP, preferably more than 90%.
2. 75%-92%, most preferably 82-88%, of two elastomeric polymers. Polymer a) and Polymer b): Polymer a) having 15-32% α-olefin, preferably 25-30%, optionally including 0.5-5% diene and Polymer b) having 32-45% α-olefin, preferably 35-40%, optionally including 0.5-5% diene. The weight ratio of polymer a) to polymer b) is 1:5 to 5:1.

The above composition may be prepared by sequential polymerisation or blending. The preferred α-olefin is ethylene. Depending on properties needed, the above compositions may be used in combination with EPR (ethylene/propylene copolymers), ethylene/propylene/diene terpolymers (EPDM), ethylene/$C_4$-$C_{12}$ α-olefins (eg. ethytene/octane such as Engage). Such elastomeric polymers may be present in 5%-80% weight of composition.

Formula Type 2:
1. 10-60 % of a crystalline propylene homo or co polymer
2. 10-40 % propylene/ethylene copolymer insoluble in xylene (i.e. low ethylene copolymer content) and
3. 30-60% ethylene/propylene copolymer soluble in xylene at room temp (i.e. high ethylene copolymer content)

The above composition may be prepared by sequential polymerisation or blending.

Formula Type 3:
1. 70-98% of a crystalline PP homo or copolymer
2. 2-30% somewhat xylene insoluble propylene/ethylene copolymer (i.e. relatively low ethylene copolymer)

This blend has a relatively high flex mod, due to the relatively high % crystalline copolymer and relatively low α-olefin PP copolymer, and may be prepared by sequential polymerisation or blending.

Other types of formulations include simple blending of a variety of different types of PP at least one polymers such as have been mentioned above, preferably PP homo polymers of different tacticities and PP α-olefin copolymers of various tacticities and degrees of α-olefin content together with at least one compatible polymers of various types, particularly mPEs and PP homo polymers of different tacticities and PP α-olefin copolymers of various tacticities and degrees of α-olefin content having a lower flex modulus than the PP at least one polymer used in the particular blend.

In addition to its use in PP blends, blends of HD/MD/LDPE with PE copolymers that can act as 'tic molecules', eg. low density mPE, can also be improved using the techniques of spherulite boundary strengthening. This enables the tie molecules to be concentrated at the crystal boundary, which effectively increases the number of tie molecules at the crystal interface, which in turn leads to increased blend ESCR.

It will be understood by those skilled in the art that the percentages of the various types of blend components illustrated in the above examples may be varied depending on the desired properties of the moulding, and mat the range of percentages of the types of blend components that will produce acceptable mouldings may be determined by experimentation.

What is claimed is:

1. A process for the manufacture of flexible thin-walled articles including:
   injection molding a blend of (a) at least one polymer and (b) at least one high melt flow compatible polymer having an MFI of greater than 100.

2. A process according to claim 1, wherein the (a) and/or (b) polymer includes a polypropylene having varying tacticity within its structure.

3. A process according to claim 1, where both (a) and (b) have an MFI of greater than 100.

4. A process according to claim 1, further including annealing the injection moulded thin-walled article.

5. A process according to claim 1, wherein the at least one polymer has a higher crystallinity than the at least one compatible polymer.

6. A process for the manufacture of flexible thin-walled articles including:
   injection molding a blend of (a) at least one polymer and (b) at least one compatible polymer, wherein at least one of (a) and (b) includes a polypropylene having varying tacticity within its structure.

7. A process for the manufacture of flexible thin-walled articles including:
   injection molding a blend of (a) at least one polymer and b) at least one compatible polymer, wherein the extractables content for the blend and/or the flexible thin-walled article manufactured is less than or equal to 2.0wt % as measured by ASTM D-5227.

* * * * *